United States Patent [19]
Ventre et al.

[11] 3,720,084
[45] March 13, 1973

[54] ELECTROMAGNETIC AND MANUAL CONTROL SYSTEMS OF VEHICLE DOOR LOCKS

[75] Inventors: Pierre Ventre; Robert Ferraris, Billancourt, France

[73] Assignees: Regie Nationale des Usines Renault, Billancourt; Automobiles Peugeot, Paris, France

[22] Filed: Dec. 11, 1970

[21] Appl. No.: 97,243

[30] Foreign Application Priority Data

Dec. 16, 1969 France.................................6943576

[52] U.S. Cl..................70/264, 70/432, 116/124 R, 180/112
[51] Int. Cl. ............................................E05b 65/36
[58] Field of Search ..........70/264; 292/144; 292/201

[56] References Cited

UNITED STATES PATENTS

| | | |
|---|---|---|
| 2,371,370 | 3/1945 | Ward......................................70/264 |
| 2,877,639 | 3/1959 | Gust........................................70/264 |
| 2,904,988 | 9/1959 | Gaida......................................70/264 |
| 2,934,930 | 5/1960 | Garvey....................................70/264 |
| 2,959,238 | 11/1960 | Dyer et al. ............................70/264 X |
| 2,139,183 | 12/1938 | Bruns ..................................292/144 X |
| 2,714,521 | 8/1955 | Graham...............................292/144 X |

*Primary Examiner*—Albert G. Craig, Jr.
*Attorney*—Stevens, Davis, Miller & Mosher

[57] ABSTRACT

This electric control device is applicable to the door locks of vehicles and comprises an electromagnetic control device having two stable positions and a reversing switch device delivering electric pulses to the electromagnetic device of all the door locks, the control lever of said reversing switch device being associated through a stud to an intermediate pivoting lever co-acting on the one hand with a pivoting locking latch connected to the electromagnetic control device and to a telltale system provided on the door, and on the other hand with a control member associated with the external key.

7 Claims, 7 Drawing Figures

PATENTED MAR 13 1973                    3,720,084

ELECTROMAGNETIC AND MANUAL CONTROL SYSTEMS OF VEHICLE DOOR LOCKS

The present invention relates to a commercial application of an electromagnetic device for simultaneously locking and unlocking the doors of a vehicle.

The function contemplated consists in controlling the locking and unlocking of all the doors of a vehicle from any-one of the two front doors (in the case of a four-door vehicle) either from the exterior or from the interior, while preserving all the possibilities afforded by a mechanical lock system.

The locked or unlocked state of each door is made visible by using a simple device.

Moreover, a safety device adapted automatically to unlock all the doors in case of sudden shock may be connected to the electric circuit contemplated.

Central devices for controlling the doors of automotive vehicles are already known which permit of locking or unlocking all the doors of a vehicle by a simple rotation of the door key.

However, these devices eliminate at least some of the useful features characterizing conventional locks, such as:

possibility of actuation in case of failure of the electric current supply, and/or unlocking when slamming a front door, and/or controlling from anyone of the two front doors. Moreover, most hitherto known devices of this character require considerable efforts and therefore the use of relatively powerful and cumbersome electromagnetic control devices.

It is the essential object of the present invention to solve the various problems set forth hereinabove in a simple yet economical manner. With the arrangement according to this invention it is possible to:

lock or unlock all the doors of an automotive vehicle from the exterior by simply rotating the key in the lock, and from the interior by rotating a knob provided on each control door, lock and unlock all the doors of an automotive vehicle from the exterior, from anyone of the front doors, the number of controlled locks being unlimited;

lock or unlock each control door in case of failure in the electric circuitry;

preserve all the other properties of a mechanical lock;

utilize a single reversing switch for the exterior and interior control;

utilize an electromagnetic control device of very moderate power rating;

visualize at a glance the locked or unlocked condition of each door by using a simple metal rod, and adapt in a simple yet economical manner the device of this invention to all types of existing locks.

The present invention is applicable to a door locking and unlocking system comprising an electromagnetic actuator having two stable positions and associated with all the door locks of a vehicle, each door lock being equipped with a pivoting catch for locking same individually.

The device according to the present invention is characterized essentially in that it comprises a single electric reversing switch of the rotary lever type which is mounted on the plate of each control lock and adapted to deliver control pulses to the electromagnetic devices of all the locks for controlling same both from the exterior and from the interior, said switch being associated with an intermediate lever coacting with a pivoting latch for preventing the lock operation, said latch being connected on the one hand to said electromagnetic control device and on the other hand to visual or telltale system provided on the door.

Each door of the vehicle is provided with a visual indicator connected to the latch for preventing the operation of the corresponding lock. The actuation of this indicator, which involves the release of the corresponding door lock, is possible only through an unusual operation.

On the other hand, an inertia switch of known type, connected to the electric system permits automatically releasing all the doors of the vehicle in case a sudden and fierce shock was applied thereto. The basic principle of this control device is applicable to all types of door locks without departing from the basic principle of the invention.

Other features of this invention will appear as the following description proceeds with reference to the accompanying drawings illustrating diagrammatically by way of example a typical form of embodiment thereof. In the drawings.

Figure 1:
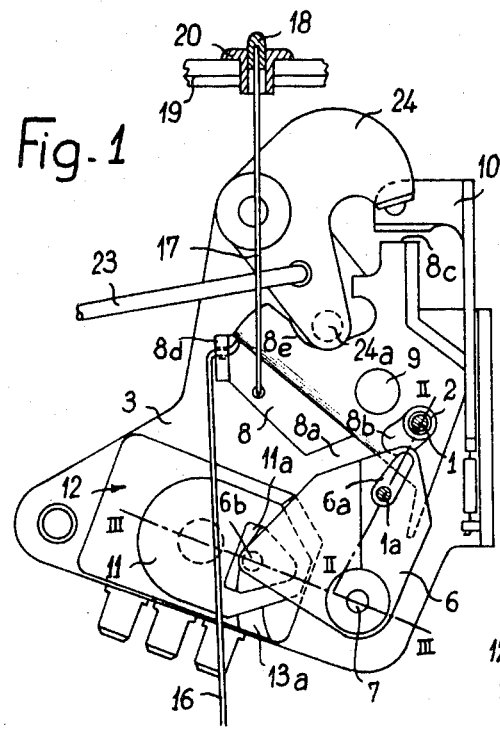
FIG. 1 is a view of a control lock in its locked position, showing the relative arrangement of the various component elements on the lock plate and also the visual indicator.
Figure 2:
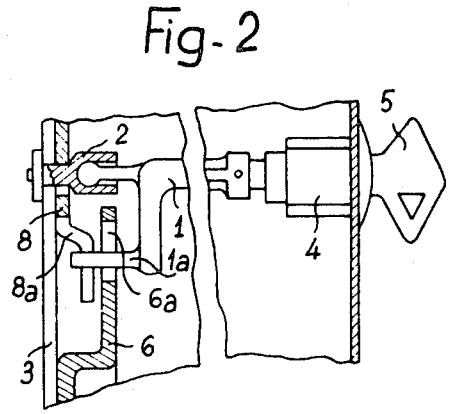
FIG. 2 is a fragmentary view of the external control system, shown in section taken along the line II—II of FIG. 1.

As illustrated in FIGS. 1 and 2 the pivot pin 1 of the door lock, centered in a pivot socket 2 rigid with the door lock plate 3 is rotatably connected to the lock tumbler cylinder 4 engageable by a key 5. A stud 1a forming a kind of fork with the pin 1 engages both the elongated hole 6a formed in an intermediate lever 6 fulcrumed to a pivot pin 7 and a notch or cavity 8a formed in the locking latch 8, the latter being adapted to prevent the operation of the door lock, as will be seen presently. This locking latch 8 is pivoted to a pivot pin 9 carried by the lock plate 3, its angular excursion being limited by a curved elongated hole 8b engaged by said pivot socket 2 so that the edges of this elongated hole 8b act as abutments to said pivot socket, as shown.

In the position preventing the lock operation as illustrated in FIG. 1 a lever 10 controlling the door opening movement abuts against the latch 8 at 8c.

Figure 3:
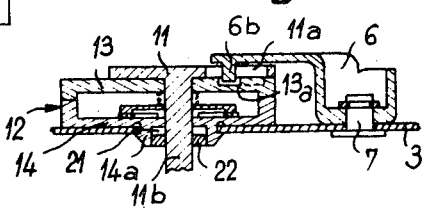
FIG. 3 is a section showing the reversing switch device and the intermediate lever, the section being taken along the line III—III of FIG. 1.

As shown in FIGS. 1 and 3, a stud 6b carried by lever 6 engages a substantially triangular aperture 11a formed in a rotary control lever 11 of reversing switch device 12, this lever 11 being rigid with a pivot pin 11b of the mechanism of this reversing switch device.

An arcuate groove 13a centered to the axis of the pivot pin 7 of lever 6 is formed in the cover 13 of the case 14 of reversing switch device 12, thus ensuring a constant length of the contact between the stud 6b and the lever 11 of said reversing switch device, irrespective of the play likely to exist or develop between the intermediate lever 6 and its pivot pin 7, so as to reduce the over-all dimensions of this reversing switch device.

The reversing switch device 12 is of the three-position type, providing a stable position leaving the circuit open, and two operative positions in which the locking and unlocking coils of the electromagnetic system are energized and de-energized, respectively. Under these conditions, the case 14 carries externally three outlet terminals 15 on which a three-wire plug (not shown) can be inserted.

A rod 16 connected for translation to an electromagnetic actuator of known type (not shown) is adapted to actuate the locking latch 8 through the medium of a bent portion 8d of this latch.

Another rod 17 connected to the locking latch 8 and provided with a preferably colored end cap 18 emerges from the door moulding or top 19 through a guide grommet 20. Thus, this rod constitutes a simple means for checking at any time the locked condition of the relevant door.

When the cap 18 is in its "locked" position the lock of the corresponding door cannot be released for operation by simply depressing this cap. To release the door lock a tool of reduced diameter, smaller than that of the guide grommet 20, would be necessary, so as to depress the cap 18 into this grommet against the return force exerted by the electromagnetic actuator, until the stroke of rod 17 causes the translation of a ferrite armature of the control member of the electromagnetic control device, so as to reverse the direction of attraction or pull of this member. In actual practice, the necessary translation is of the order of 7 to 8 mm (about five-sixteenths inch. This unusual operation may be considered as constituting an additional safety against tampering by children.

Figure 4:
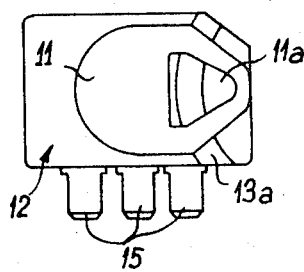
FIG. 4 is an elevational view of the reversing switch device in its inoperative position.
Figure 5:
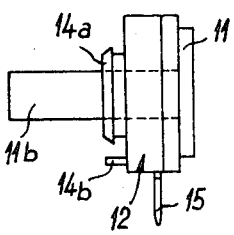
FIG. 5 is a side elevational view of the reversing switch device.

The reversing device 12 of a very flat type (see FIGS. 3, 4 and 5), may be secured very rapidly to the lock plate 3 by means of a resilient fastening member 14a of case 14 engaging an aperture 21 of plate 3. A pin 14b of case 14 permits properly positioning the case in relation to the plate 3 ; a gasket 22 is provided for sealing the joint around the pivot pin 11b.

Since by using the arrangement of this invention the number of control locks is not a limiting factor, in an exemplary form of embodiment it will be assumed that the control lock is the one illustrated in FIG. 1.

In this case, the actuation of the key 5 inserted into the lock tumbler cylinder 4 is attended by a rotation of the pivot pin 1 centered in socket 2. Thus, the stud 1a of pivot pin 1 rotates the intermediate lever 6 and tilts the latch 8.

Figure 6:
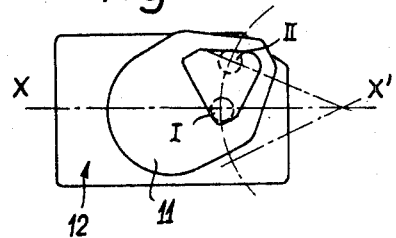
FIG. 6 is a view similar to FIG. 4 but showing the manner in which the reversing switch device is actuated through a stud carried by the intermediate lever to the OPEN position.
Figure 7:
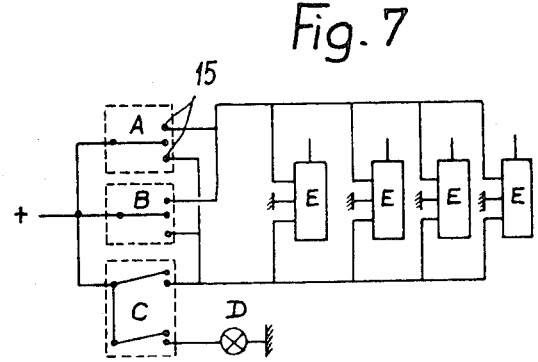
FIG. 7 illustrates the wiring diagram of the installation in the case of a four-door vehicle.

After a movement of predetermined angular amplitude the stud 6b carried by lever 6 engages the hollow contour of lever 11 of reversing switch device 12 and rotates said lever 11 (FIG. 6, the stud in position "II" corresponding to an unlocking operation). Thus, the reversing switch device will close the circuit for energizing each coil of the electromagnetic device E corresponding to the operative condition as seen in the wiring diagram of FIG. 7. This diagram includes two reversing switch devices A and B, since two doors are provided with control locks.

In the "release" position the lever 11 is in a position symmetrical in relation to the axis X-X' of reversing switch device 12 (FIG. 6).

Under these conditions, it is clear that actuating the key 5 in the lock tumbler cylinder 4 will act :

on the one hand directly upon the latch 8 for latching the control lock, on the other hand upon the reversing switch device 12 delivering electric pulses to all the coils of the electromagnetic devices.

The locking or unlocking operation can thus be performed on each control lock, even in case of failure in the electric supply circuit, due to the provision of the "-double" control circuit.

At the end of this operation the tumbler cylinder 4 resumes its initial intermediate position, thus moving the stud 1a and therefore the lever 6. As the lever 11 of reversing switch device 12 is no more urged for rotation, it resumes its inherent position of equilibrium, thus re-opening the circuit.

Under these conditions, the contact is maintained only during the time period in which the key is rotated in the lock tumbler cylinder.

Considering that the lock illustrated in FIG. 1 becomes a receptor lock, the electromagnetic device will then actuate through the medium of rod 16 the locking latch 8. Since the latter can move freely about its pivot pin 9 due to its notch 8a, the control effort required therefor is extremely reduced, thus permitting the use of electromagnetic devices of very low power rating.

From the interior of the vehicle the user can thus actuate electrically all the locking latches of the various doors by actuating the rotary control lever 11 to which a rotating knob may be attached, thereby actuating the same reversing switch device 12 as utilized for the external control. This lever 11 is provided to this end with a specially designed contour 11a permitting the actuation of its pivot pin 11b without interfering with the movement of stud 6b of lever 6 (FIG. 6, with stud 6b in position "I").

All the usual mechanical control actions are preserved in this device, and the locking latch is adapted to be operated independently of the electrical control system. The electromagnetic system will then operate as a bistable spring.

By way of example, reference may be made to a door lock release system for opening from the interior, of a type known per se, which, by means of a rod 23 (FIG. 1), is adapted to pivot a lever 24 which, through the medium of a stud 24a is adapted in turn to slide along the contour 8e of the locking latch 8 so as to tilt same. Under these conditions, the lever 24 can subsequently release the door lock bolt by means of lever 10.

A suitably calibrated inertia switch C connected in parallel to the unlocking circuit (FIG. 7) is adapted to release automatically all the doors in case of sudden and fierce shock. In this case, the coils of the electromagnetic devices E remain energized, so that it is possible to connect thereto :

either a timing device for cutting off the supply of energizing current, or, as shown in the diagram, a telltale lamp D for warning the user that the system has been actuated and therefore the inertia switch must be reset.

Although a specific form of embodiment of this invention has been described and illustrated herein, it will readily occur to those conversant with the art that many modifications and variations may be brought thereto without departing from the spirit and scope of the invention, as set forth in the appended claims.

What is claimed as new is:

1. An electromagnetic and manual control device for locking automotive vehicle doors, comprising:

for each door an electromagnetic actuator having fixed coils energized by a power source, and a movable member actuatable by said coils, each door having a lock mounted on a plate, and a pivoting latch member, said movable member being connected to said latch, the control device further comprising for at least one of the control doors a lock tumbler cylinder, connected to said pivoting latch member and actuatable by a key, and a rotatable control knob disposed on said door inside the vehicle, and fixed on the lock plate of said control door a single electrical reversing switch device for delivering pulses to said electromagnetic actuator for locking and unlocking all the doors of a vehicle, and means for releasing and unlocking by slamming the previously locked door if closed inadvertently, said control device further comprising on said control door lock plate an intermediate lever, coacting with said pivoting latch and associated with said reversing switch, said reversing switch further connected with a rotary control lever to which said rotatable control knob is connected for manual actuation, and a telltale device connected to the pivoting latch of each door for indicating the lock status of each door.

2. A device according to claim 1, wherein said lock plate carries a pivot pin, said intermediate lever is mounted on said pin and has an elongated hole in one portion thereof, said lock further comprising a control member associated with said lock tumbler cylinder and engaging said elongated hole for rotating said lever and tilting said pivoting latch, and said intermediate lever also comprising a stud coacting with the control lever of said reversing switch.

3. A device according to claim 2, wherein said reversing switch comprises a flat case adapted to be resiliently fastened to said lock plate, and a pin for positioning said case on said lock plate, said case formed with an arcuate groove centered about the axis of rotation of said intermediate lever and receiving in said groove the stud on said intermediate lever, the control lever of said switch having a substantially triangular aperture therein in which said stud engages said control lever for rotating said control lever.

4. A device according to claim 3, wherein said control member comprises a fork-like member rotatably actuatable by said lock tumbler cylinder, said fork-like member centered on said lock plate by one of its arms extending through a curved aperture in the pivoting latch, the curved edges of said aperture centered about the axis of rotation of said latch, the other arm of said fork-like member engaging an elongated hole formed in the intermediate lever and an opening formed in said pivoting latch, for simultaneously actuating said reversing switch and said locking latch.

5. A device according to claim 2, wherein said telltale device comprises a rod having one end operatively connected to said locking latch and a free end carrying a cap, and a grommet in the door moulding to guide said cap.

6. A device according to claim 1, wherein an inertia unlocking switch is connected in a parallel circuit to said reversing switch.

7. A device according to claim 1, wherein the electromagnetic actuator comprises two fixed tandem coils, and said movable member is rigid with a ferrite permanent magnet.

* * * * *